United States Patent [19]

Yanagihara et al.

[11] Patent Number: 5,720,442
[45] Date of Patent: Feb. 24, 1998

[54] CAPSTANLESS TAPE DRIVING METHOD AND INFORMATION RECORDING AND REPRODUCTION APPARATUS

[75] Inventors: Norihisa Yanagihara; Shinsuke Nakagawa, both of Ibaraki-ken; Shigeyuki Kobata; Masao Iwakura, both of Odawara; Kazuo Sakai, Ibaraki-ken, all of Japan

[73] Assignee: Hitachi, Ltd., Tokyo, Japan

[21] Appl. No.: 680,791

[22] Filed: Jul. 16, 1996

[30] Foreign Application Priority Data

Jul. 19, 1995 [JP] Japan .................... 7-182536

[51] Int. Cl.[6] .................... B65H 59/38; G11B 15/46
[52] U.S. Cl. .................... 242/334.2
[58] Field of Search .................... 242/334, 334.2, 242/334.3, 352, 352.1, 357; 318/6, 7; 360/96.3

[56] References Cited

U.S. PATENT DOCUMENTS

| | | | |
|---|---|---|---|
| 4,015,799 | 4/1977 | Koski et al. | 318/7 |
| 4,125,881 | 11/1978 | Eige et al. | 242/334.3 |
| 4,160,195 | 7/1979 | Sakamoto | 242/334.1 |
| 4,525,654 | 6/1985 | Tajima et al. | 242/334.3 |
| 4,620,241 | 10/1986 | Ono | 242/334.3 |
| 4,664,336 | 5/1987 | Koyama | 242/334.3 |
| 4,740,732 | 4/1988 | Way | 318/7 |
| 4,786,992 | 11/1988 | Tajima et al. | 242/334.3 |
| 4,788,606 | 11/1988 | Uchikoshi | 242/334.4 |
| 4,817,887 | 4/1989 | Harigaya et al. | 242/334.3 |
| 5,012,989 | 5/1991 | Whyte, Jr. et al. | 242/334 |
| 5,039,027 | 8/1991 | Yanagihara et al. | 242/334.2 |
| 5,138,504 | 8/1992 | Nishijima et al. | 242/334.3 |
| 5,222,684 | 6/1993 | Yoneda et al. | 242/334.2 |
| 5,259,563 | 11/1993 | Kakiwaki et al. | 242/334.3 |
| 5,400,980 | 3/1995 | Yoshikawa | 242/334.2 |
| 5,540,398 | 7/1996 | Nishida et al. | 242/334.2 |

FOREIGN PATENT DOCUMENTS

| | | |
|---|---|---|
| 3-171459 | 7/1991 | Japan . |
| 7-57206 | 3/1995 | Japan . |
| 7-85539 | 3/1995 | Japan . |

*Primary Examiner*—John P. Darling
*Attorney, Agent, or Firm*—Antonelli, Terry, Stout, & Kraus, LLP

[57] ABSTRACT

A load torque imposed on a take-up reel motor is estimated from the current in a take-up reel motor and the rotational speed of the take-up reel. The current value supplied to the take-up reel motor is adjusted on the basis of the estimated load torque. A tape feed rate detected is compared with a reference signal produced from a target tape speed signal. On the basis of the comparison result, the torque of the take-up reel motor is controlled in such a manner that the tape feed rate assumes a predetermined value. The gain of a speed control system for controlling the rotational speed of the take-up reel is adjusted on the basis of a detected period of tape speed.

16 Claims, 10 Drawing Sheets

CAPSTANLESS TAPE DRIVING METHOD AND INFORMATION RECORDING AND REPRODUCTION APPARATUS

BACKGROUND OF THE INVENTION

The present invention relates to a tape driving method and an information recording and reproduction apparatus in which a long object like a magnetic tape is fed by means of a supply reel and a take-up reel, or more in particular to a capstanless tape driving method and an information recording and reproduction apparatus in which a tape is fed at constant speed without using a capstan and a pinch roller.

A conventional tape driving apparatus for feeding a tape at constant speed without using a capstan and a pinch roller is disclosed, for example, in JP-A-3-171459. In this well-known method, a tape speed sensor is arranged in a tape running path and the tape speed is controlled by two reels including a supply reel and a take-up reel.

FIG. 11 is a diagram showing a configuration of an information recording and reproduction apparatus for explaining a conventional method of driving the tape at constant speed and a conventional method of controlling the tape tension without using a capstan when the tape is running at a slow speed as at the time of VTR recording or reproduction.

A conventional method of driving a tape at constant speed for an information recording and reproduction apparatus will be described below with reference to FIG. 11.

In FIG. 11, a tape 1 is withdrawn from a supply reel (S reel), wound on a drum 4 having a rotary magnetic head (not shown) built therein, and by being guided by posts 3a to 3e, is taken up on a take-up reel (T reel) 5.

In controlling the tape speed, the rotational period information of a roller 6 arranged on the tape running path from the supply reel 2 to the take-up reel 5 is detected by a roller rotation period detector 17. The rotational speed of the take-up reel is controlled in such a manner as to secure constant rotational period information of the roller.

The roller 6 has a frequency signal generator 9, which is adapted to produce a pulse signal (FG signal) of a frequency proportional to the rotational speed of the roller 6.

The FG signal of the roller 6 produced from the frequency signal generator 9 is applied to a roller rotation period detector 17 and the resulting period information TRFG of the FG signal is applied to a subtractor 18.

A target tape speed value VTREF, on the other hand, is applied to a reference roller speed generator 19, and a corresponding target period value TREF of the FG signal of the roller 6 is applied to the subtractor 18. The subtractor 18 calculates the difference between the target speed TREF and the roller FG period information TRFG, and the difference thus calculated is supplied to a take-up reel motor driving circuit 8T thereby to control the rotational speed of a take-up reel motor 7T. More specifically, the tape speed information is detected by the roller, and compared with a target speed to control the rotational speed of the take-up reel motor 7T. The tape speed thus can be controlled at constant level.

Now, the tension control operation will be described. Back torque information proportional to the tape radius RS of the supply reel 2 is added to acceleration compensation torque information for suppressing the tension variations attributable to the acceleration and deceleration of tape feed, and the resulting error information is used to control the torque of the supply reel motor 7S.

First, explanation will be made about a method of calculating the tape radius and the moment of inertia of each reel as required for tension control. The supply reel 2 and the take-up reel 5, like the roller 6, are arranged with frequency signal generators 10S, 10T for producing a pulse signal (FG signal) of a frequency proportional to the rotational speed. This pulse signal is applied to period detectors 11S, 11T for detecting the rotation period of the reels 2, 3. Tape radius calculating circuits 12S, 12T are supplied with the rotation period information of each reel and the roller rotation period information (tape speed information) to calculate the radius of each reel. The tape radius calculating circuits 12S, 12T thus produce the tape radius information. Inertia calculators 13S, 13T are supplied with the tape radius of each reel for calculating and producing the moment of inertia of the reels.

Under steady conditions, a back torque calculator 15 is supplied with a target tape tension TTREF and a supply reel tape radius RS, and a command to generate a torque proportional to the supply reel tape radius RS is applied from the back torque calculator 15 to a supply reel motor driving circuit 8S.

Under a transient condition such as when the tape speed changes from stop to play mode, a torque command for the take-up reel motor is applied to an acceleration compensation current calculator 14. The driving torque for the supply reel is thus calculated and produced from the tape radius and the inertia of the supply reel on the one hand and the tape radius and the inertia of the take-up reel on the other hand.

An adder 16 adds the back torque under steady state and the tape acceleration and deceleration torque under transient state to each other, and outputs the sum to the supply-reel motor driving circuit 8S.

In this way, the tension can be controlled stably under both steady and transient states.

In the above-mentioned conventional method, tape speed is detected by measuring the rotation period of a roller. When the frequency of the rotational pulse signal output from a frequency signal generator attached to the roller is low (i.e., when the tape speed is low or the resolution of the FG signal of the roller is low), the control period is lengthened. For the speed control to be stabilized, therefore, the gain of the control system cannot be set high. For this reason, the problem is posed that variations of the tension load imposed on the take-up reel motor and the torque ripple of the take-up reel motor increases the speed deviation and speed variations, thereby making it difficult to produce the tape speed control performance required for recording and reproduction.

SUMMARY OF THE INVENTION

In view of the above-mentioned facts, an object of the present invention is to provide a capstanless tape driving method and an information recording and reproduction apparatus in which speed variations are small even when the pulse frequency produced from a roller is low, i.e., even when the speed detection intervals are long.

The object of the invention is achieved by a combination of one or more of the following methods (1) to (3) for improving the control accuracy.

(1) According to one aspect of the present invention, there is provided a capstanless tape driving method wherein two reel motors for driving a supply reel and a take-up reel are controlled in accordance with the tape speed detected by a tape speed detector interposed between the supply reel and the take-up reel, and the tape wound on the supply reel is fed to the take-up reel without using a capstan while at the same time maintaining the tape tension and the tape speed at a target value, the method comprising the steps of estimating the load torque imposed on the take-up reel motor from the take-up reel motor current and the rotational speed of the take-up reel and supplying the take-up reel motor with the current required for the take-up reel motor to generate a torque equivalent to the estimated load torque.

(2) According to another aspect of the invention, there is provided a capstanless tape driving method. Two reel motors for driving a supply reel and a take-up reel are controlled in accordance with the tape speed detected by a tape speed detector interposed between the supply reel and the take-up reel. The tape wound on the supply reel is fed to the take-up reel without using a capstan while at the same time maintaining a tape tension and a tape speed at a target value. The pulse frequency generated by the roller at the time of recording and reproduction is assumed to be an integral multiple or one over an integral multiple of the reference signal such as a drum rotational frequency. A phase control loop is added for synchronizing the pulse generated by a roller with a reference signal. The tape feed rate is detected by a tape feed rate detector interposed between the supply reel and the take-up reel, and the torque of the take-up reel motor is controlled in such a manner that the tape feed rate assumes a predetermined constant value.

(3) According to still another aspect of the invention, there is provided a capstanless tape driving method, wherein two reel motors for driving a supply reel and a take-up reel are controlled in accordance with the tape speed detected by a tape speed detector interposed between the supply reel and the take-up reel. The tape wound on the supply reel is fed to the take-up reel without using a capstan while at the same time maintaining the tape tension and the tape speed at a target value. The method further comprises the step of changing the gain of the speed control system for controlling the rotational speed of the take-up reel in accordance with the tape speed detection period.

According to a further aspect of the invention, there is provided an information recording and reproduction apparatus, in which two reel motors for driving a supply reel and a take-up reel are controlled in accordance with the tape speed detected by a tape speed detector interposed between the supply reel and the take-up reel. The tape wound on the supply reel is fed to the take-up reel without using a capstan while at the same time maintaining the tape tension and the tape speed at a target value, thereby recording and reproducing the information on the tape. The tape is fed by a capstanless tape driving method according to any of the methods (1) to (3) above.

An advantage obtained by the present invention is that since a control loop is added for detecting and compensating for the load imposed on a take-up reel motor by detecting the rotational speed of the take-up reel motor and the current for driving the take-up reel motor, any added torque variations including tension variations can be accommodated thereby to suppress speed variations.

According to the invention, the apparatus is so configured to further comprise a phase control loop for synchronizing the pulse generated by a roller and a reference signal, and therefore the speed control characteristic can be improved.

Further, according to the invention, the gain of a speed control system is variable in accordance with the speed detection period. Therefore, the characteristics of the control system can be optimally regulated in accordance with the control period, thereby minimizing the speed variations.

As described above, according to the invention, the gain of a tape speed control system is made variable according to the period of tape speed detection, and the phase control controlled by a roller is added. Thus, the load variations imposed on the reel motor are compensated for, and the disturbances affecting the tape speed system are minimized so that the speed variations are suppressed below a predetermined value, thereby making it possible to perform a satisfactory recording and reproduction operation.

DESCRIPTION OF THE PREFERRED EMBODIMENTS

Figure 1:
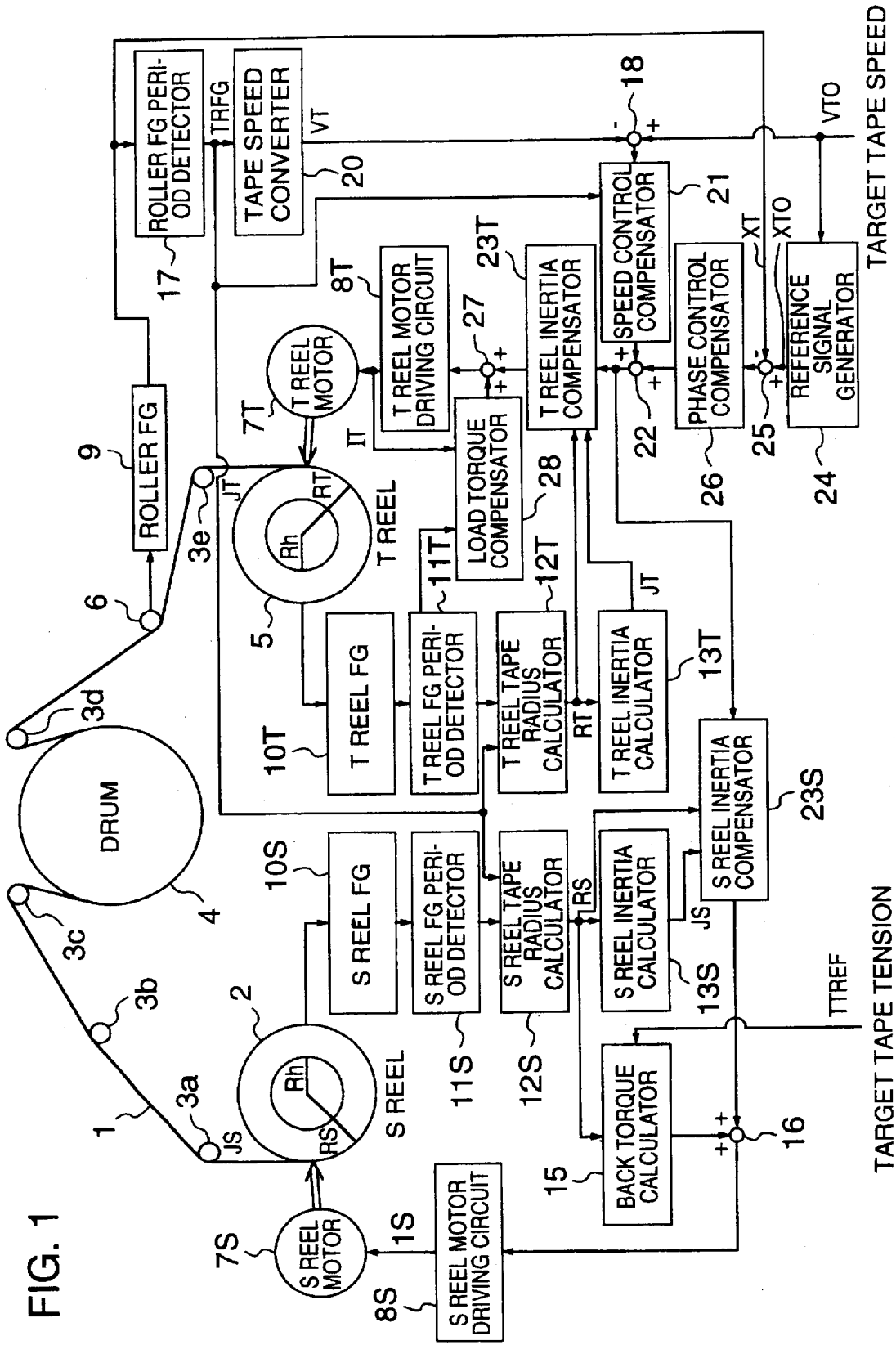
FIG. 1 is a block diagram showing a configuration of an information recording and reproduction apparatus for implementing a capstanless tape driving method according to an embodiment of the invention.
Figure 11:
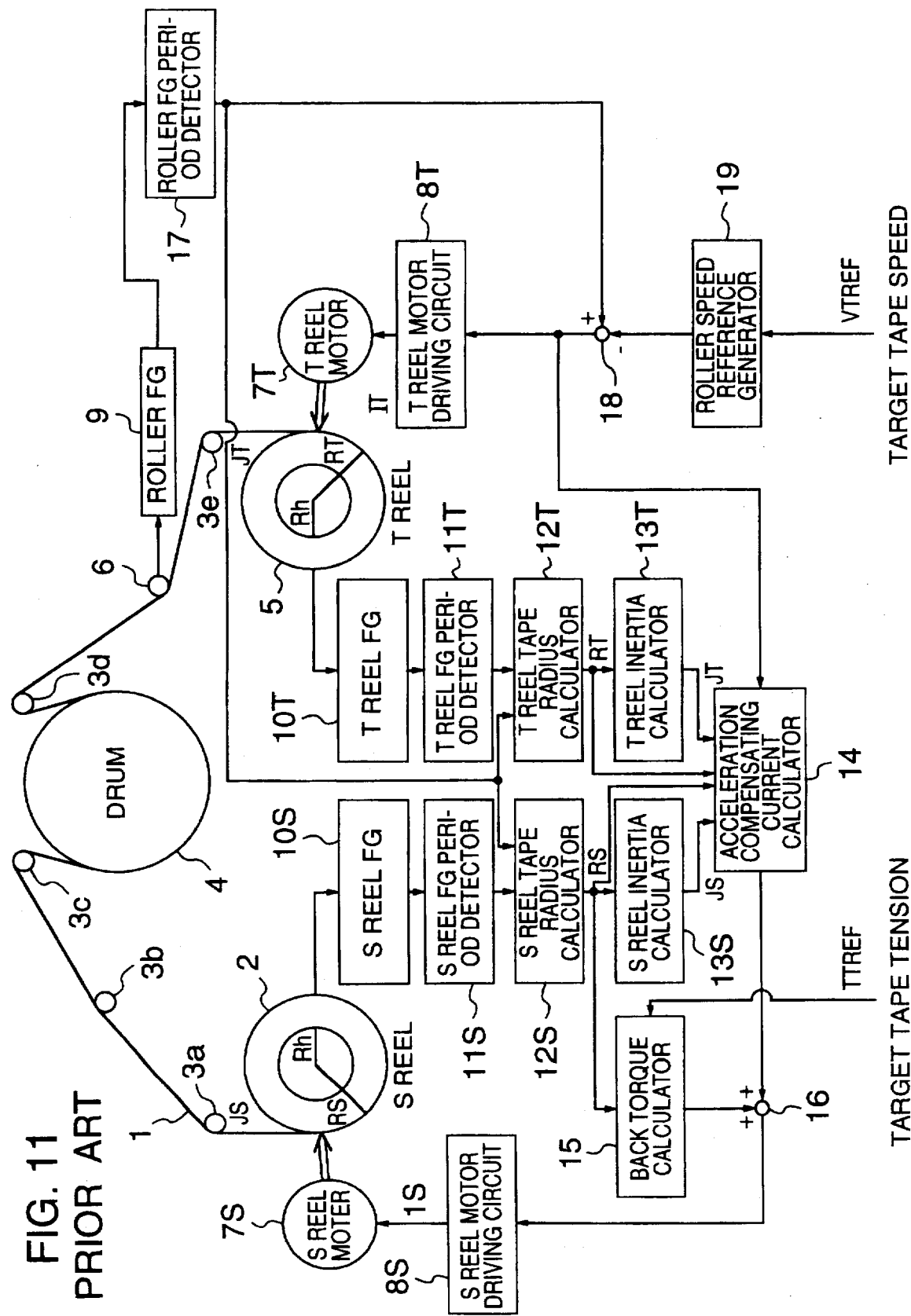
FIG. 11 is a block diagram showing a configuration of an information recording and reproduction apparatus using a conventional capstanless tape driving method.

An embodiment of the invention is described below with reference to the accompanying drawings. FIG. 1 shows a configuration of an information recording and reproduction apparatus for implementing a capstanless tape driving method according to an embodiment of the invention. In FIG. 1, the component parts operating the same way as corresponding ones of the prior art in FIG. 11 are designated by identical reference numerals respectively.

According to this embodiment, a tension control loop and a speed control loop are provided for a supply (S) reel, while a speed control loop and a position control loop are configured for a take-up (T) loop.

A tape 1 is withdrawn from a supply reel 2, fed by being guided through guide posts 3a to 3e and taken up on a take-up reel 5. Information is recorded and reproduced on the tape magnetically by means of a magnetic head (not shown) arranged on a rotating drum 4.

First, explanation will be made about a method of controlling the tape speed by the take-up reel. Reference is made to a method of detecting the tape speed and a method of calculating a tape radius and a reel moment of inertia, as required for control.

For detecting the tape speed, the rotation period of a roller 6 arranged on a tape feed path from the supply reel 2 to the take-up reel 5 is detected by a roller rotation period detector 17 and converted into tape speed by a tape speed converter 20.

The roller 6 has attached thereto a frequency signal generator 9. This frequency signal generator 9 is adapted to produce a pulse signal (hereinafter referred to as the FG signal) of a frequency proportional to the rotational speed. The FG signal of the roller 6 is applied to a roller rotation period detector 17 for detecting period information TRFG of the FG signal. This period information is produced by being converted into a tape speed VT by the tape speed converter 20. Assuming that the resolution of the frequency signal generator 9 is RRFGP (pulses/rev.) and the radius of the roller 6 is RR (m), then the frequency FRGF (Hz) of the roller FG signal for the tape speed of VT (m/s) is given by $$FRFG = VT/(2 \times \pi \times RR) \times RRFGP \quad (1)$$

The following relation holds between the frequency FRFG of the FG signal and the period TRFG.

$$TRFG = 1/FRFG \quad (2)$$

From equations (1) and (2), it is seen that the period TRFG of the roller FG signal and the tape speed VT have the following relation.

$$VT = (2 \times \pi \times RR)/(RRFGP \times TRFG) \quad (3)$$

In equation (3), the roller radius RR and the resolution RRFGP of the frequency signal generator 9 are constant, and therefore the tape speed VT can be detected from the period TRFG constituting an output signal of the roller rotation period detector 17.

The supply reel 2 and the take-up reel 5, like the roller 6, have frequency signal generators 10S, 10T attached thereto, respectively. These frequency signal generators 10S, 10T are so configured as to produce a pulse signal (FG signal) of a frequency proportional to the rotational speed. The pulse signals output from the frequency signal generators 10S, 10T are input to period detectors 11S, 11T, respectively, which in turn detect the period of the FG signals of the reels 2, 5.

Tape radius calculating circuits 12S, 12T are supplied with FG period information and roller rotation period information of the reels 2, 5, and output tape radius information. This operation will be explained with reference to the take-up reel system as an example.

Assuming that the rotational frequency of the take-up reel 5 is FTR (Hz), the rotational angular velocity ωT (rad/s) of the take-up reel 5 is expressed by the following equation:

$$\omega T = 2 \times \pi \times FTR \quad (5)$$

When the resolution of the frequency signal generator 10T of the take-up reel 5 is assumed to be RTFGP (pulses/rev.), the frequency FTFG (Hz) of the FG signal is given as $$FTFG = RTFGP \times FTR \quad (5)$$

The frequency FTFG and the period TTFG of the FG signal hold the relation $$FTFG = 1/TTFG \quad (6)$$

From equations (4), (5) and (6), the rotational angular velocity ωT of the take-up reel 5 is expressed by equation (7)

$$\omega T = 2 \times \pi/(RTFGP \times TTFG) \quad (7)$$

The resolution RTFGP of the frequency signal generator 10T of the take-up reel 5 is constant. Hence, the rotational angular velocity ωT of the take-up reel 5 can be calculated from the period TTFG of the FG signal.

In steady state, the tape feed rate VTT (m/s) due to the take-up reel 5 coincides with the tape speed VT (m/s) detected by the speed detection roller 6. When the tape radius of the take-up reel 5 is assumed to be RT (m), the following equation holds $$VTT = RT \times \omega T = VT \quad (8)$$

Substituting equations (3) and (7) into equation (8) gives the tape radius RT of the take-up reel 5 as $$RT = (RTFGP/RRFGP) \times (TTFG/TRFG) \times RR \quad (9)$$

Equation (9) shows that it is possible to obtain the tape radius RT of the take-up reel from the FG period TTFG of the take-up reel 5 and the FG period TRFG of the roller 6.

In similar fashion, the tape radius RS of the supply reel 2 is given by $$RS = (RSFGP/RRFGP) \times (TSFG/TRFG) \times RR \quad (10)$$

where RSFGP is the resolution of the frequency signal generator 10S of the supply reel 2 and TSFG is the period of the FG signal.

The moment of inertia of each reel can be determined from the tape radius of each reel. Take the take-up reel 5 as an example.

The moment of inertia JT of the take-up reel 5 is given as the sum of the moment of inertia JTTAPE of the tape 1 and the moment of inertia JREEL of the reel itself with tape 1 yet to be wound $$JT = JREEL + JTTAPE \quad (11)$$

The moment of inertia of the reel itself includes the moment of inertia of the rotating parts of the motor and the moment of inertia of the reel hub and assumes a constant value not dependent on the tape radius, etc. The tape moment of inertia is given as $$JTTAPE = KI \times (RT^4 - Rh^4) \quad (12)$$

where RT is the tape radius, Rh is the radius of the reel hub, and KI is a proportionality constant determined by the tape parameters including tape width and tape density.

From equations (11) and (12), the moment of inertia JT of the take-up reel 5 is expressed as $$JT = JREEL + KI \times (RT^4 - Rh^4) \quad (13)$$

Similarly, with the supply reel 2, the moment of inertia JS of the supply reel 2 is given as $$JS = JREEL + KI \times (RS^4 - Rh^4) \quad (14)$$

where RS is the tape radius of the supply reel 2, and it is assumed that the supply reel 2 and the take-up reel 5 use the same type of motor and reel hub.

The tape radii of the reels 2, 5 are output from the tape radius calculators 12S, 12T of the respective reels 2, 5 and input to inertia calculators 13S, 13T. The moment of inertia of the reels 2, 5 are thus calculated and output based on equations (13), (14).

Now, explanation will be made about a method of controlling the tape speed VT detected by the tape speed converter 20 using the calculation of equation (3).

A subtractor 18 compares a target tape speed value VTO with a tape speed VT detected and outputs a speed error signal. The error signal is input to a speed control compensator 21, where the error signal is amplified with a gain GST and output to an adder 22.

Next, phase control will be explained. The phase control is performed in order to maintain a constant tape feed rate and to attain a further improvement in accuracy of the control based on a speed error. A reference signal generator 24 generates a reference signal of a frequency corresponding to a target tape speed value VTO. The frequency FRREF of the reference signal is the same as the frequency FRFG (Hz) of the FG signal generated by the roller 6 when the tape 1 is running at the target tape speed value. In other words, the frequency FRREF (Hz) of the reference signal holds the following relation with the tape speed VT of equation (1) when the tape speed VT is substituted as the target tape speed value VTO $$FRREF = VTO/(2 \times \pi \times RR) \times RRFGP \quad (15)$$

The phase difference between the reference signal and the FG signal of the frequency signal generator 9 is determined by a subtractor 25. A phase error signal detected by the subtractor 25 is input to a phase control compensator 26 where the phase error signal is amplified and output to an adder 22.

In this explanation, the frequency FREF of the reference signal output from the reference signal generator 24 is assumed to be the same as the frequency FRFG of the FG signal of the frequency signal generator 9 with respect to the tape speed for recording and reproduction. Alternatively, one of the two frequencies may be an integer multiple of the other. In such a case, only one of the signals is frequency divided.

The adder 22 adds the speed error signal and the phase error signal to each other and outputs the sum to a take-up reel inertia compensator 23T. The take-up reel inertia compensator 23T multiplies the input error signal with the ratio between the tape radius and the reel inertia of the take-up reel 5. In other words, the gain CCT of the take-up reel inertia compensator 23T is expressed as $$GCT = JT/RT \quad (16)$$

This gain changes with the progression of the tape 1. This take-up reel inertia compensator 23T functions to compensate for the radius of the tape 1 on the take-up reel and the reel inertia and to obtain a predetermined gain characteristic. The error signal amplified by the take-up reel inertia compensator 23T is output to an adder 27.

A load torque compensator 28 is for estimating and compensating for a mechanical load torque imposed on a take-up reel motor 7T. The load torque compensator 28 is supplied with the drive current IT of the take-up reel motor and a rotational angular velocity $\omega T$ calculated according to equation (7) from the period TTFG detected by the period detector 11T. A signal for generating a torque corresponding to the load torque is applied to the adder 27.

The adder 27 adds the output of the take-up reel inertia compensator 23T to the output of the load torque compensator 28, and outputs the sum to a take-up reel motor drive circuit 8T.

The take-up reel motor drive circuit 8T is a current-type amplifier for supplying a current proportional to an input signal to a motor. More specifically, assuming that an input signal voltage is VGCT (V) and a gain is GTM (A/V), a current IT (A) expressed by the following equation is supplied to the take-up reel motor 7T $$IT = GTM \times VGCT \quad (17)$$

It is seen that when the torque constant of the take-up reel motor 7T is assumed to be KT, the torque TRMT (Nm) generated is proportional to the motor current IT $$TRMT = KT \times IT = KT \times GTM \times VGCT \ (Nm) \quad (18)$$

Consequently, the take-up reel motor generates a torque proportional to the output VGCT of the adder 27.

The speed control, the phase control and the load torque compensation described above contribute to control the tape speed of the take-up reel motor 7T in a manner to attain a target value.

The effects of the invention will be described with reference to a block diagram of the take-up reel control system.

Figure 2:
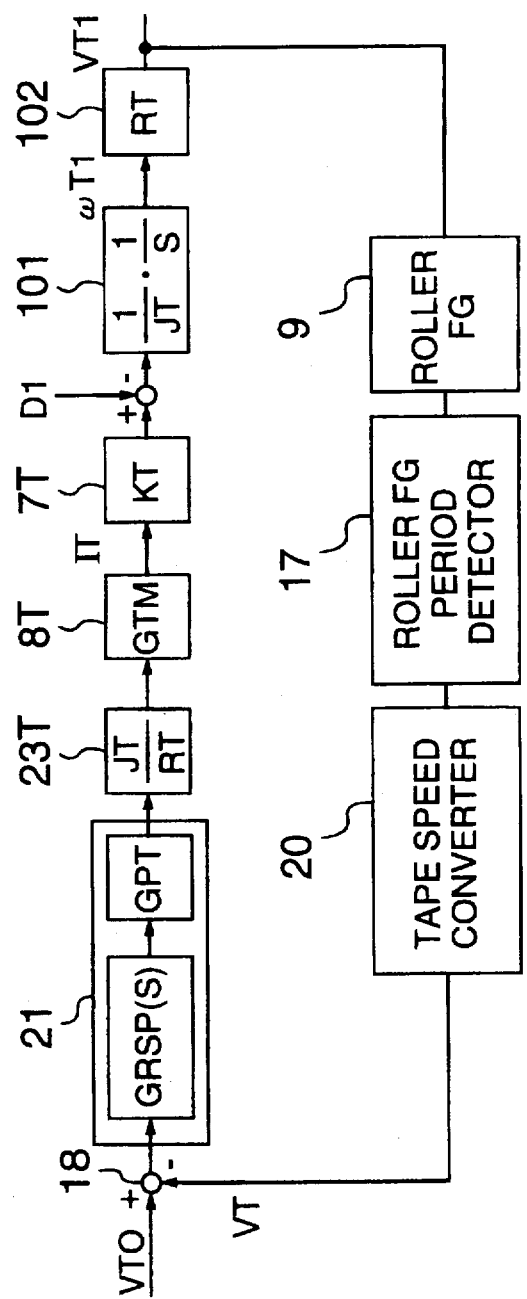
FIG. 2 is a block diagram showing only the speed control loop of the take-up reel control system in FIG. 1 in terms of transfer functions.

FIG. 2 is a block diagram showing only a speed control loop of the take-up reel control system (including the component parts 20, 21, 22, 23T, 27, 8T, 7T, 5, 6, 9, 17 in FIG. 1).

The speed control compensator 21 includes a sample-and-hold block GRSP(s) and an amplifier block with a gain GST.

GRSP(s) represents in terms of a transfer function, that the tape speed is detected for each roller rotation period TRFG and the result of detection is held for a time TRFG. As shown by the equation below, this value GRSP(s) can be approximated as a delay time of TRFG. Character "s" in parenthesis indicates a Laplace operator $$GRSP(s) = \exp(-TRFG \times s) \quad (19)$$

The take-up reel inertia compensator 23T is an amplifier having a gain of JT/RT, and the take-up reel motor drive circuit 8T is an amplifier having a gain of GTM. For the take-up reel motor 7T, the motor characteristics are represented by a torque constant KT. Blocks 101, 102 represent an equation of motion of the take-up reel 5. The rotational angular velocity $\omega T1$ and the tape speed VT1 are real values. $\omega T$ and VT without suffix represent measured values.

From the block diagram of FIG. 2, an open-loop transfer function GVTO(s) is determined only for the speed control system with respect to a target tape speed input as the equation below shows $$GVTO(s) = GRSP(s) \times GST \times GCT \times GTM \times KT \times RT/JT \times 1/s \quad (20)$$

Where the blocks 9, 17 and 20 for detecting VT1 assume that each of the transfer functions thereof is "1", they are ideally structured.

When the tape radius RT and the reel inertia JT in the gain GCT (=JT/RT) of the take-up reel inertia compensator 23T in equation (20) coincide with actual values, i.e., when the detection error is zero, JT and RT in GCT are canceled and the equation is simplified as shown in equation (21), $$GTVO(s) = GRSP(s) \times GTM \times KT \times GST \times 1/s \quad (21)$$

Actually, equation (21) cannot be used straightforward since each constant contains an error. The error, however, is not more than several %, and therefore can be substantially ignored. General characteristics are thus considered coincident with those represented by this equation.

Figure 3:
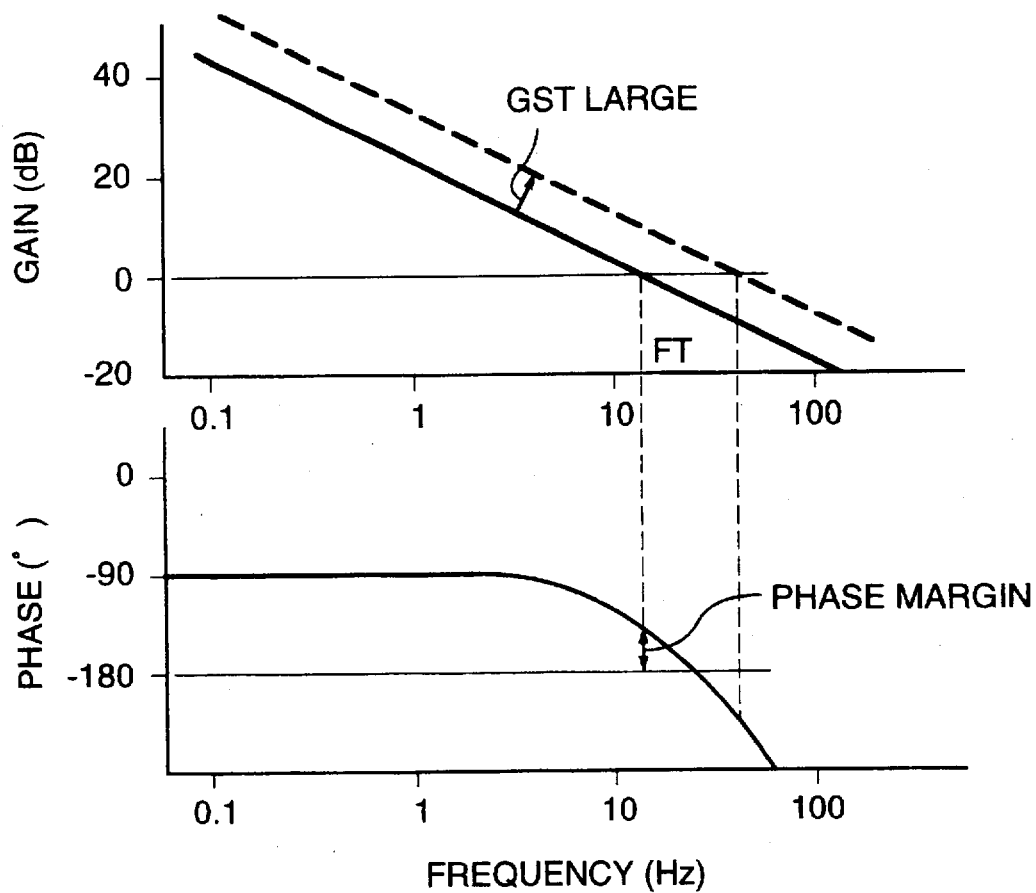
FIG. 3 is a diagram showing frequency characteristics for gain compensation in the control system shown in FIG. 2.

A frequency characteristic associated with this equation is shown in FIG. 3. A gain versus phase characteristic is shown in FIG. 3 with frequency plotted along the abscissa. From equation (21), it is seen that the open-loop transfer function GTVO (s) is a primary function of "s" and the phase should not go below −90°. Due to a delay time of GRSP (s), however, the phase goes below −180° in high-frequency regions. Consequently, with the increase in gain GST, the zero-cross frequency FT increases so that the phase margin assumes a negative value, thereby causing instability. In other words, the gain GST has a certain limitation. This limitation varies with the magnitude of delay time, i.e., the speed detection period.

Figure 12:
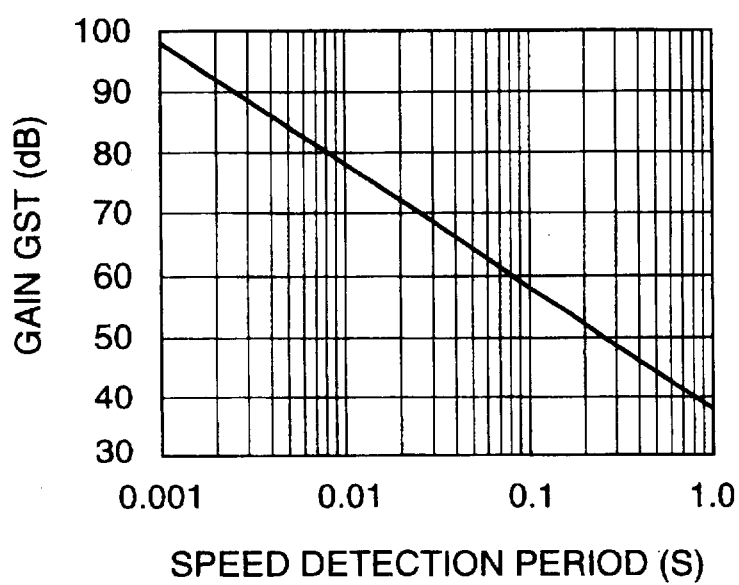
FIG. 12 is a diagram showing the relation between the gain of the speed control system and the tape speed detection period.

As an example, the relation between speed detection period and gain GST for maintaining the phase margin at a constant value of 45° is shown in FIG. 12. FIG. 12 shows that if the same phase margin is to be obtained, the gain GST is required to be reduced for a long speed detection period. In the case where the speed detection period is short, by contrast, the gain GTS must be increased.

In FIG. 1, the speed detection period is equal to the period TRFG of the FG signal of the speed detection roller FG6. The relation shown in FIG. 12 is stored in memory as table data, and the gain GST is regulated in accordance with the value of the speed detection-period. These control operations can also be realized in hardware by means of a CPU according to a program.

From FIG. 2, a transfer characteristic associated with the speed error EVT(s) due to the target tape speed value VTO and a disturbance D1 affecting the tape speed is expressed by $$EVT(s) = VTO(s) - VT(s) \quad (22)$$

$$= \frac{s}{s + e^{-TRFG \cdot s} \cdot GST \cdot GTM \cdot KT} VTO(s) + \frac{R/JT}{s + e^{-TRFG \cdot s} \cdot GST \cdot GTM \cdot KT} D_1(s)$$

In equation (22), the speed error due to the target tape speed value VTO is represented by the first term, and the speed error due to the disturbance D1 by the second term. Let us consider the case where the target value VTO and the disturbance D1 are step inputs (change from 0 to 1) of magnitude vt0 and d1, respectively, indicated by equation (23)

$$VTO(s) = 1/s \times vt0, \quad D1(s) = 1/s \times d1 \quad (23)$$

The steady deviation (steady residual error) associated with this equation is given as $$\lim_{t \to \infty} evt(t) = \lim_{s \to 0} (s \cdot EVT(s)) \quad (24)$$

$$= \lim_{s \to 0} \left( \frac{s}{s + e^{-TRFG \cdot s} \cdot GST \cdot GTM \cdot KT} vt0 + \frac{RT/JT}{s + e^{-TRFG \cdot s} \cdot GST \cdot GTM \cdot KT} d1 \right)$$

$$= 0 \cdot vt0 + \frac{RT/JT}{GST \cdot GTM \cdot KT} d1$$

From equation (24), the steady deviation is seen to assume zero for the target tape speed value VTO, but the steady error remains as one over gain (1/GST) for the disturbance D1.

As a result, the larger the gain GST, the smaller the steady deviation of speed. As shown in FIG. 3, however, excessively large gain will cause an instability.

Figure 4:
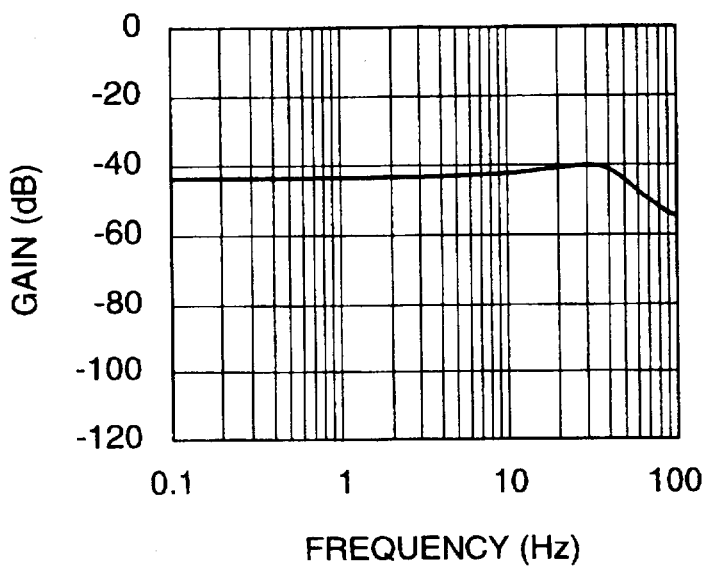
FIG. 4 is a diagram showing frequency characteristics of disturbances for gain compensation of the control system of FIG. 2.

The steady deviation represents a characteristic associated with the frequency of zero (DC). The effect of the disturbance D1 on the speed error for other frequencies (AC) is shown as a frequency characteristic in FIG. 4. This graph represents a characteristic of equation (22) with respect to D1. FIG. 4 shows the gain associated with speed error. As shown, the smaller the gain, the smaller the effect of the disturbance D1 leading to a better characteristic. The abscissa of FIG. 4 represents the frequency (Hz) and the ordinate thereof the gain (dB). From FIG. 4, it is seen that the gain is substantially constant so that the effect of the disturbance D1 is transmitted regardless of the frequencies.

Figure 5:
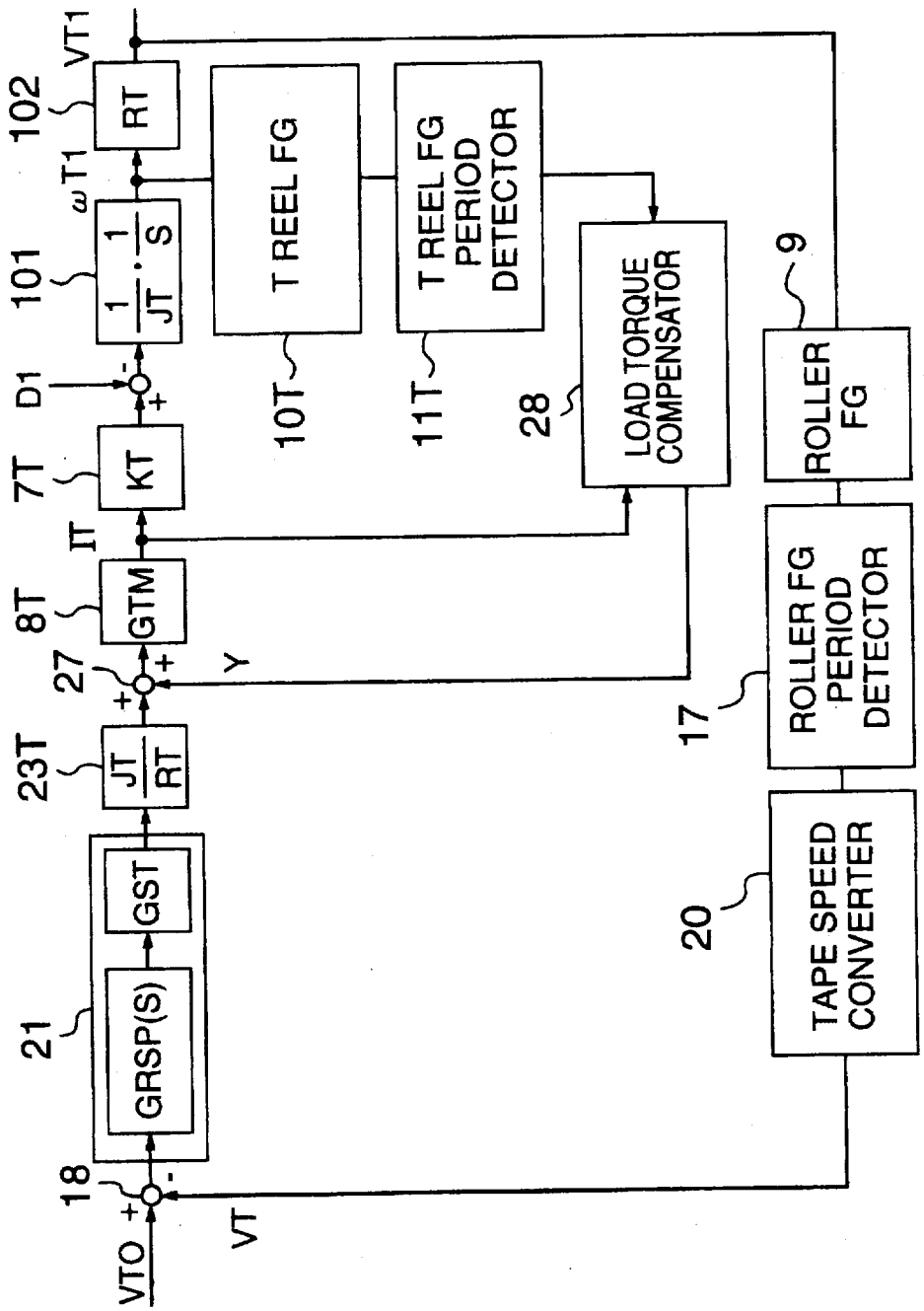
FIG. 5 is a block diagram showing, in terms of a transfer function, the speed control loop of the take-up reel control system having the torque compensator of FIG. 1 added thereto.
Figure 6:
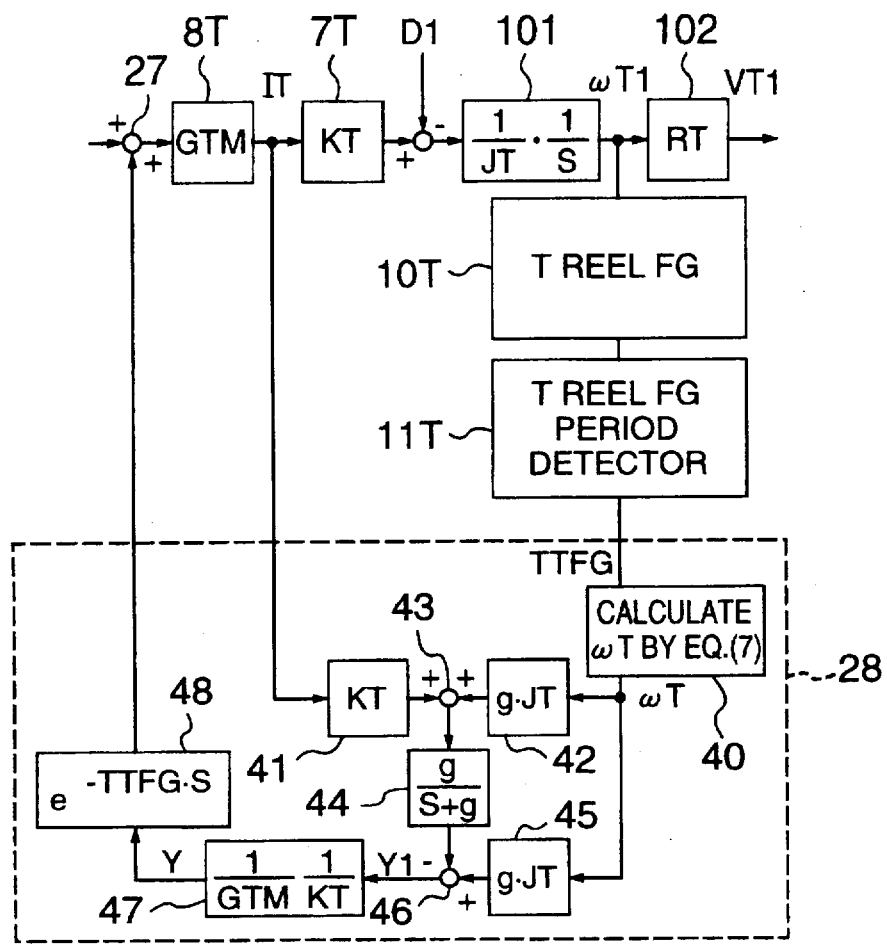
FIG. 6 is a block diagram showing an example configuration of a load torque compensator.

In order to reduce the steady deviation due to the disturbance D1 to zero, a load torque compensator 28 is added. A related block diagram is shown in FIG. 5. FIG. 6 is a block diagram showing an example configuration of the load torque compensator 28. In FIG. 6, the part defined by a dashed line represents the load torque compensator 28, in which g/(s+g) is a low-pass filter having a cut-off frequency g.

The load torque compensator 28 can be either configured in hardware or realized by a program executed by a CPU.

Figure 13:
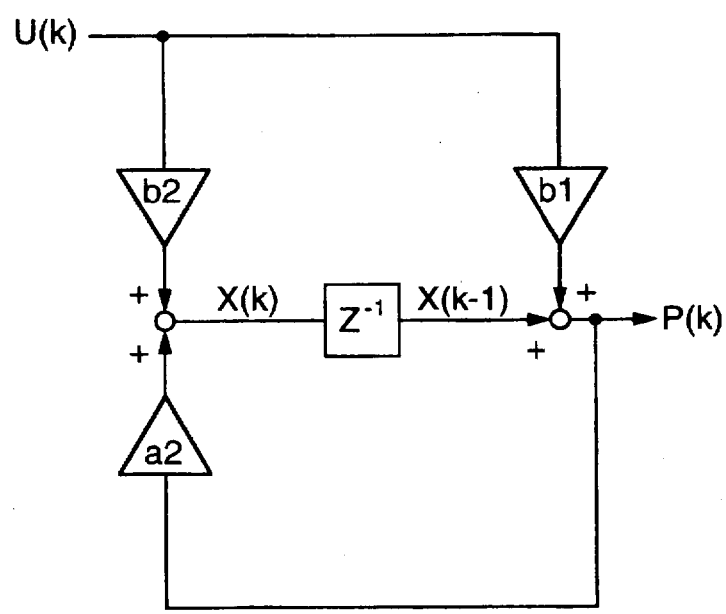
FIG. 13 is a block diagram showing an embodiment of a low pass filter.

Explanation will be provided for when the load torque compensator 28 is implemented by a CPU (not shown) built in an information recording and reproduction apparatus according to the invention. In step 40, the rotational angular velocity ωT is calculated by equation (7). Step 41 increases the motor current IT by a factor of KT (=torque constant of the take-up reel motor). Step 42 multiplies the rotational angular velocity ωT by g·JT. Step 43 adds a signal representing the motor current IT multiplied by KT to a signal representing the rotational angular velocity ωT multiplied by g·JT. The resulting sum is applied through a low-pass filter having a transfer function of g/(s+g) at step 44. The low-pass filter can be realized in various ways. It can be realized, for example, as shown in FIG. 13. In FIG. 13, "z" represents a Z transformation. $Z^{-1}$ represents a previous time by one sampling. U(k) represents an input. P(k) represents an output. X(k) represents an internal status. The affix "k" represents k-th data.

When input U(k) is given, the output P(k) is obtained as follows.

$$P(k) = b1 U(k) + X(k-1),$$

where X(k−1) = a2 P(k−1)+b2U(k−1), where U(k−1) is a previous input before by one, and P(k−1) is a previous output before by one.

The factors a2, b1 and b2 are obtained from the sampling period TTFG and the cutoff frequency g as follows.

$$a2 = \frac{2 - g \cdot TTFG}{2 + g \cdot TTFG}$$

$$b1 = \frac{g \cdot TTFG}{2 + g \cdot TTFG}$$

$$b2 = \frac{g \cdot TTFG}{2 + g \cdot TTFG}$$

Namely, the characteristic of the low pass filter can be realized by weighting the present input U(k), previous input U(k−1) before one and previous output P(k−1) before one and by adding them. Step 45 multiplies the rotational angular velocity ωT by g·JT. Step 45 can be implemented alternatively by storing the result of step 42 in memory and reading out the stored value. Step 46 subtracts the output of the low-pass filter from the signal representing the product of the rotational angular velocity ωT and g·JT. The signal obtained by subtraction is assumed to be Y1. Step 47 multiplies the signal Y1 by the reciprocal (=1/(GTM×KT)) of the product of the amplification gain GTM and the torque constant KT. Multiplication of 1/KT converts the signal into a current, and multiplication of 1/GTM further converts it into a drive command voltage. The signal obtained by the multiplications is assumed to be Y. Step 48 samples and holds and inputs the signal Y to the adder 27.

When the load torque compensator 28 is configured in hardware, the component 41 is made up of an amplifier having a gain of KT. Numerals 42, 45 designate amplifiers having a gain of g·JT. Numeral 43 designates an adder. Numeral 44 designates a low-pass filter having a cut-off frequency of g. Numeral 46 designates a subtractor, numeral 47 indicates an amplifier having a gain of 1/(GTM×KT), and numeral 48 designates a sample-and-hold circuit.

The signal Y1 is determined according to a block diagram (FIG. 6) as shown below.

$$
\begin{aligned}
Y1 &= \omega T \cdot g \cdot JT - (IT \cdot KT + g \cdot JT \cdot \omega T) \cdot g/(s+g) \quad (25)\\
&= g/(s+g) \cdot (JT \cdot s \cdot \omega T - IT \cdot KT)\\
&= g/(s+g) \cdot D1 \approx D1
\end{aligned}
$$

Equation (25) indicates that the load torque compensator 28 is such that the signal Y1 is based on estimation of the disturbance D1 since the relation g/(s+g)=1 is satisfied when s<g in a region associated with less than the cut-off frequency of the low-pass filter.

The disturbance D1 is considered to include a tension load and a friction load imposed on the take-up reel motor.

The load torque compensator 28 outputs a torque to compensate for the steady load torques such as the tension load and the friction load imposed on the take-up reel motor as described above.

Figure 7:
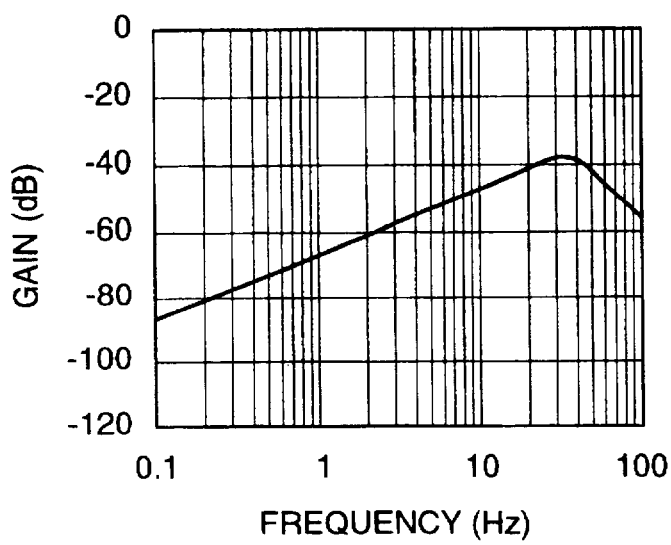
FIG. 7 is a diagram showing disturbance characteristics for the apparatus further comprising a load torque compensator.

This compensation torque can reduce the effect of the disturbance D1 on the speed error. The characteristic effect of the disturbance D1 on the speed error with a load torque compensator added is shown in FIG. 7. In FIG. 7, a low-pass filter is designed with a cut-off frequency of 30 Hz. For this reason, it is seen that the gain is reduced at the rate of 20 dB/DEC in the regions associated with the cut-off frequency of 30 Hz or less.

Comparison of FIG. 7 with FIG. 4 shows that the characteristics against the disturbances are improved in the low-frequency regions (30 Hz or less), indicating that the lower the frequency, the larger the improvement. Also, it is seen that the gain approaches zero to such an extent that the steady deviation is zero for the frequency of zero.

Figure 8:
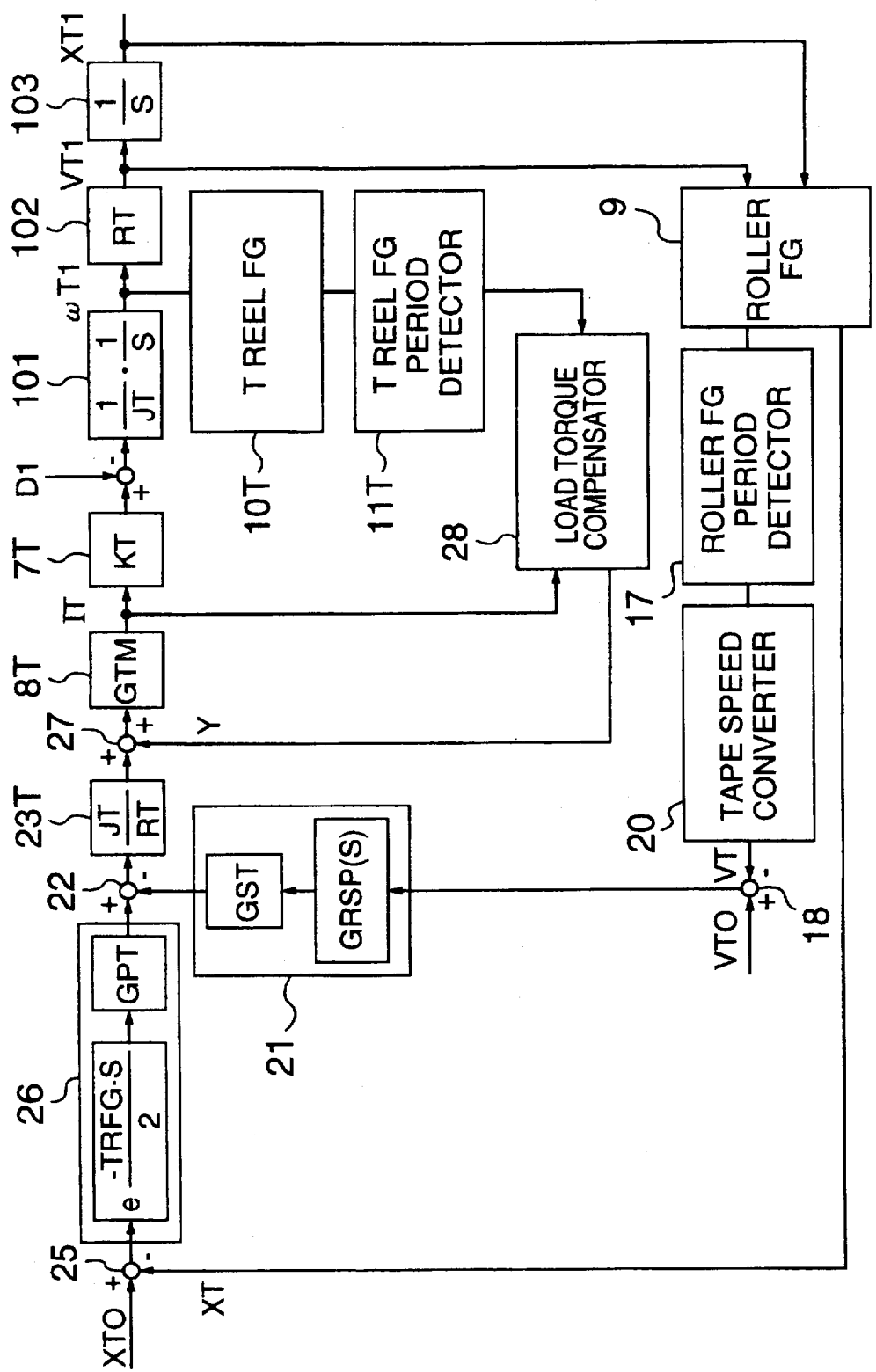
FIG. 8 is a block diagram showing in terms of a transfer function, the speed control loop of the take-up reel control system further including a phase control loop in FIG. 1.

A method of further improving the characteristics is by adding a phase control compensator 26 which secures synchronization between the reference signal and the roller FG signal. In such a case, the reference signal frequency and the frequency of the roller FG 9 holds the relation that one is an integer multiple of the other. A block diagram for when this synchronizing control loop is added is shown in FIG. 8. In FIG. 8, the loop for attaining synchronization is seen to have such a construction as to feed back the positional information objected by integrating the speed. The sync control loop, therefore, is hereinafter called the phase control loop.

Blocks 101, 102, 103 represent an equation of motion of the take-up reel 5. XT1 designates an actual value, and XT designates a measured value.

In this phase control loop, a target tape speed value VTO is frequency-converted into a value XT0 at a reference signal generator 24. A frequency signal XT from the roller FG 9 is input to a phase error detector 25. The phase difference between the value XT0 and the frequency signal XT is determined at the phase error detector 25. The phase delay or the phase advance characteristic is added and output by a phase control compensator 26. The phase error represents a positional error of the tape. The phase control compensator 26 can be implemented by the conventional version. For example, the phase control system can be stabilized by using a Lead-Lag Filter or a PID compensator.

Where XT0 is in phase advance relative to XT, XT is controlled upward, with the result being that the phase error becomes zero. When XT0 is in phase delay relative to XT, by contrast, XT is controlled downward, resulting in the phase error of zero. When the phase error becomes zero, the reference signal XT0 is synchronized with the signal XT from the roller FG 9, so that the tape feed rate assumes a predetermined constant value.

Figure 9:
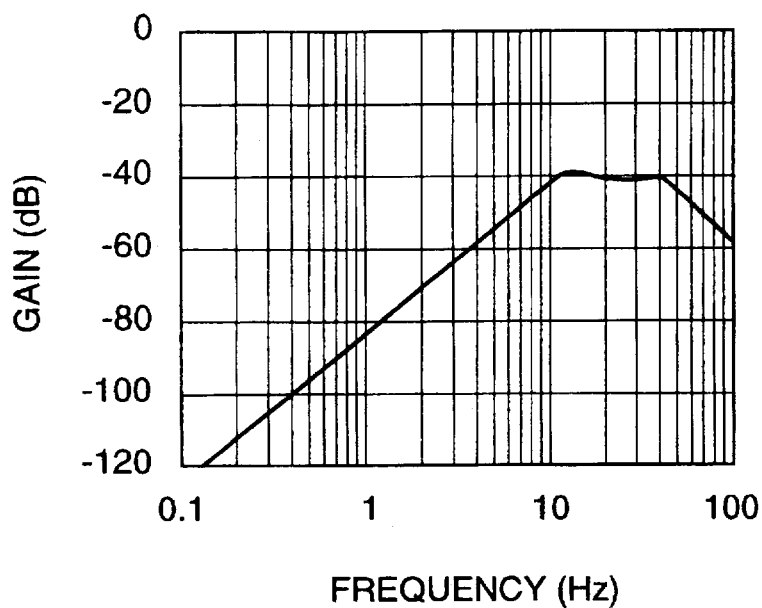
FIG. 9 is a diagram showing the disturbance characteristics of apparatus controlled by a speed control loop, a load torque compensator and a phase control loop.

The transfer characteristic representing the disturbance D1 with respect to the speed error is shown in FIG. 9. FIG. 9 indicates that the gain is reduced at the rate of 40 dB/DEC in the regions associated with 10 Hz or lower. The characteristic is seen to have further improved as compared with the case of FIG. 6 in which a load torque compensator is added.

The tape speed for recording or reproduction of a VTR of helical type using a rotary head is very low at less than several cm per second. Hence, the rotational frequency of the tape reel is also as low as less than 1 Hz. Consequently, speed variations caused by the torque ripple of the reel motors, the tape tension change synchronized with reel rotation, or the like, are less than several Hz. The characteristics shown in FIGS. 7 and 9 show that speed variations of less than several Hz is a result of considerable reduction effected by the load torque compensator and the positional control loop as compared with the conventional speed variations. Specifically, the tape speed variations for recording and reproduction, which were about ±20% according to conventional methods, can be reduced to less than ±5%.

In helical recording, tape speed variations present themselves as a track displacement. For the tape speed variations of ±5%, the interval variations of the track helically recorded on the tape are ±5%. When the track interval (pitch) is 10 μm, for example, the variation is ±0.5 μm for a maximum displacement of 1 μm. When the speed variation is ±5% or less, therefore, the effect on reproduction output is 10% or less, thereby making possible satisfactory recording and reproduction.

Now, an explanation will be provided regarding the tension control by the supply reel 2 shown in FIG. 1. Back torque information proportional to the tape radius of the supply reel 2 is added to acceleration/deceleration compensation torque information for suppressing the tension variations accompanying tape acceleration/deceleration. The resulting information is used to control the torque of the supply reel motor 7S.

In FIG. 1, the supply reel motor driving circuit 8S, like the take-up reel motor driving circuit 8T, is a current-type amplifier for supplying a current proportional to the input signal to the motor. Specifically, the supply reel motor 7S is supplied with a current IS (A) shown below $$IS = GSM \times VGCS \quad (26)$$

where VGCS (V) is an input signal voltage and GSM (A/V) is a gain. Assuming that the torque constant of the supply reel motor 7S is given as KS, the torque SRMT (Nm) generated is proportional to the motor current IS and is expressed as $$SRMT = KS \times IS = KS \times GSM \times VGCS \; (Nm) \quad (27)$$

The supply reel motor 7S thus generates a torque proportional to the input voltage VGCS.

A target tape tension value TTREF is input to a back torque calculator 15 which outputs a torque command corresponding to the tape radius RS. More specifically, the output VGTS of the back torque calculator 15 is given as $$VGTS = RS \times TTREF / (KS \times GSM) \quad (28)$$

where RS (m) is the tape radius of the supply reel 2 and TTREF (N) is the target tape tension.

In other words, the supply reel motor 7S generates a torque corresponding to the tape tension load (RS×TTREF) in response to the output of the back torque calculator 15.

Consider the steady state where the tape 1 is running at a predetermined rate representing a target tape speed. In this case, with the take-up reel motor 7T, a current corresponding to the steady load torque is compensated or supplied by the load torque compensator 28, and the tape is running at the target speed without steady deviation. The speed error signal, i.e., the output of the speed control compensator 21, therefore, produces a zero output, and so does the phase control compensator 26. In other words, the output of the adder 22 is zero. The input to the supply reel inertia compensator 23S thus is also zero.

The supply reel inertia compensator 23S corresponds to the take-up reel inertia compensator 23T. The gain of the supply reel inertia compensator 23S is expressed as $$GCS = JS / RS \quad (29)$$

This equation shows that the output of the supply reel inertia compensator 23S is zero since the input thereto is zero.

Under this condition, the torque generated by the output of the back torque calculator 15 is in equilibrium with the actual tension load. The supply reel motor 7S thus rotates at constant speed, and the tension coincides with the target tension TTREF.

Now, let us consider the acceleration/deceleration mode as at the time of tape rise. When the target tape speed is changed so that the tape speed is different from the target speed, the output of the adder 22 for adding the speed error and the phase error is not zero. The output voltage of the adder 22 in the process is assumed to be VGT.

In the take-up reel motor 7T, the load torque is compensated for by the output of the load torque compensator 28. The voltage VGT is used in its entirety for increasing and/or decreasing the rotational speed of the reel. The equation of motion of the take-up reel motor 7T thus is given as $$JT \times d\omega T / dt = KT \times GTM \times JT / RT \times VGT \quad (30)$$

The related tape speed VTT of the take-up reel motor 7T is $$VTT = RT \times \omega T \quad (31)$$

Equation (30) is integrated to give the rotational angular velocity $\omega T$ of the take-up reel 5

$$\omega T = \int KT \times GTM \times 1/RT \times VGT \, dt \quad (32)$$

The tape speed VTT thus is given from equations (31) and (32) as $$VTT = \int KT \times GTM \times VGT \, dt \quad (33)$$

Since the tension load of the supply reel motor 7S is compensated for by the back torque calculator 15, the equation of motion of the supply reel motor 7S is expressed as $$JS \times d\omega S / dt = KS \times GSM \times JS / RS \times VGT \quad (34)$$

The associated tape speed VTS due to the supply reel 2 is $$VTS = RS \times \omega S \quad (35)$$

Equation (34) is integrated to obtain the rotational angular velocity $\omega S$ of the supply reel 2

$$\omega S = \int KS \times GSM \times 1/RS \times VGT \, dt \quad (36)$$

Thus, from equations (35) and (36), the tape speed VTS is given as $$VTS = \int KS \times GSM \times VGT \, dt \quad (37)$$

Equations (33) and (37) show that the tape speed VTT due to the take-up reel 5 can be rendered to coincide with the tape speed VTS due to the supply reel 2 even under transient conditions free of tension variations, when the supply reel 2 and the take-up reel 5 use the motors and amplifiers of the same specification, i.e., when KT=KS and GSM=GTM.

When motors and amplifiers of different specifications are used for the two motors, on the other hand, a gain for compensating for the difference is inserted in advance.

The configuration of a supply reel control system shown in FIG. 1 can assure stable tension control under transient as well as steady states.

Figure 10:
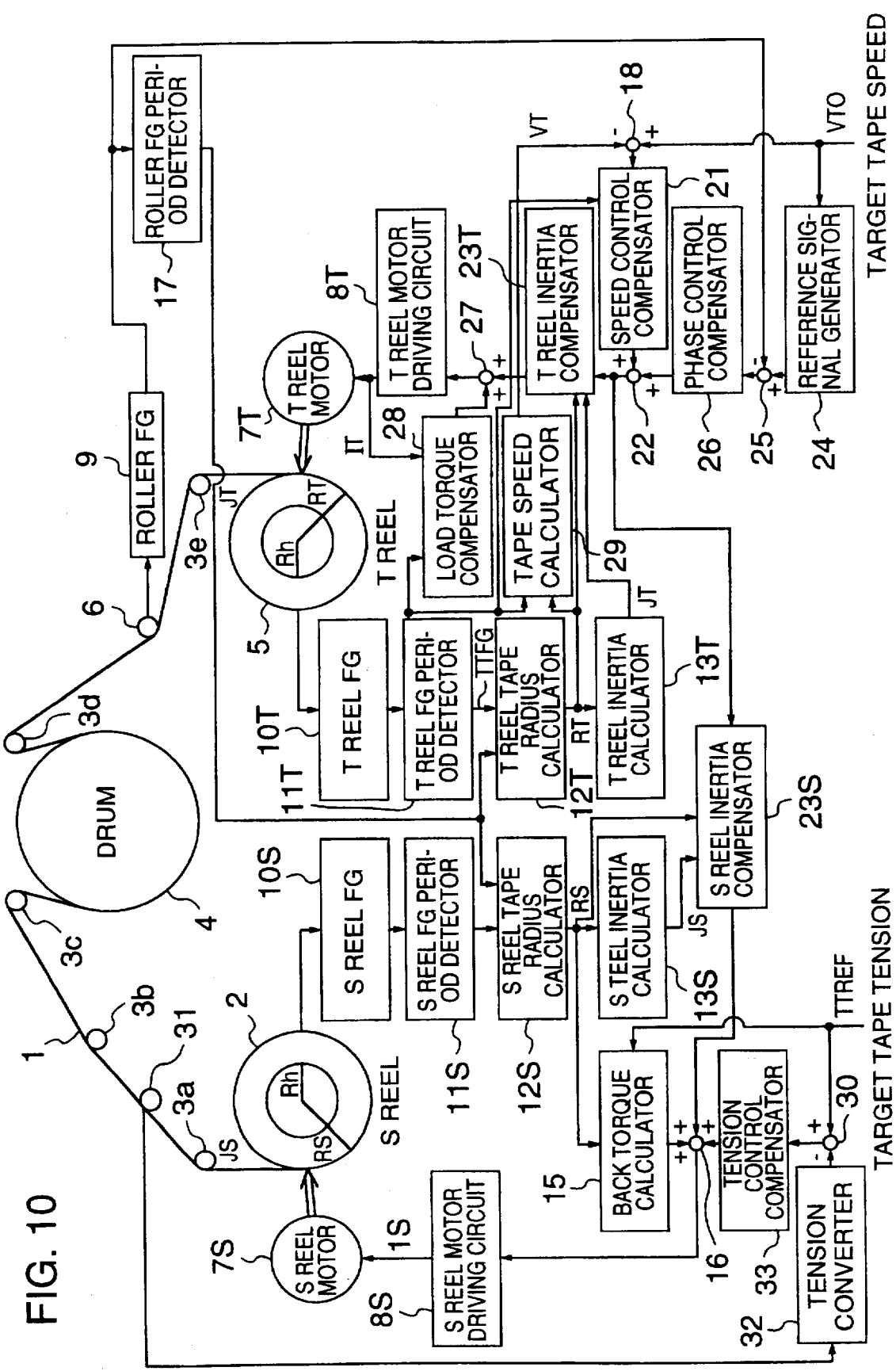
FIG. 10 is a block diagram showing a configuration of an information recording and reproduction apparatus for realizing a capstanless tape driving method according to another embodiment of the invention.

Another embodiment of the invention is described with reference to FIG. 10. In FIG. 10, the tape speed is determined not from the signal of a frequency signal generator 9 provided for a speed detection roller 6 but from the signal of a frequency signal generator 10T mounted on a take-up reel 5.

The FG signal from the frequency signal generator 10T provided for the take-up reel 5 is input to a period detector 11T. Let the period of the take-up reel FG signal be TTFG. The rotational angular velocity $\omega T$ of the take-up reel motor 7T is given by the equation shown below. This equation is identical to equation (7)

$$\omega T = 2\pi/(RTFGP \times TTFG) \quad (38)$$

The tape speed VT coincides with the tape speed of the take-up reel 5 under steady state. This tape speed is thus expressed by the following equation using the tape radius RT of the take-up reel 5

$$VT = RT \times \omega T = RT \times 2\pi/TTFG \quad (39)$$

In FIG. 10, an output TTFG of the period detector 11T and an output RT of a take-up reel tape radius calculator 12T are input to a tape speed calculator 29. The calculation of equation (39) is carried out to output the tape speed VT. In other words, the tape speed is calculated for each period of the take-up reel FG signal. As a consequence, with the progress of the tape, the changing tape radius RT causes a change in the tape speed detection period.

The tape speed VT determined by the tape speed calculator 29 is compared with the target tape speed value VTO at a subtractor 18, and the resulting error signal is amplified at a speed control compensator 21. The output of the speed control compensator 21 is input to a take-up reel inertia compensator 23T. After that, as described above, the rotational speed of the take-up reel 5 is controlled thereby to control the tape speed.

The gain of the speed control compensator 21 is adjusted according to the period of the take-up reel FG signal. With a large tape radius RT, the period of the take-up reel FG signal is lengthened, and vice versa. The period of the take-up reel FG signal is the period of tape speed detection. As described with reference to the roller rotation period above, the detection period is held for each detection, and therefore constitutes a delay time in terms of control. When the period TTFG is long, the delay time is lengthened, and vice versa. The stability (phase margin) characteristic of the control system thus is subjected to variations. When the period of the take-up reel FG signal is short, therefore, the gain of the speed control compensator 21 is increased, and vice versa. In this way, the gain of the control system is maximized with a minimum speed error while at the same time maintaining the stability of the control system in accordance with the change in detection period.

More specifically, the gain GST is regulated using the relation between the speed detection period and the gain GST as shown in FIG. 12 predetermined from the phase margin required. A method is by storing the relation between the speed detection period and the gain GST shown in FIG. 12 as a table data, and the gain GST is determined from the information on the speed detection period. These control operations can be realized either by a program through a CPU or in hardware.

Another method of determining the optimum gain GST is by calculating the relation of FIG. 12 using a CPU.

According to this embodiment, where the period of the take-up reel FG signal is shorter than the period of the FG signal of the tape speed detection roller 9, the tape speed detection period is reduced more than when the speed detection roller is used. The characteristic of the control system can thus be improved (the gain can be improved), thereby reducing the tape speed variations.

Also, in view of the fact that the gain is adjusted in accordance with the period of the take-up reel FG signal, the gain of the take-up reel speed control system can be maximized under the circumstances while securing the stability in accordance with the change in the speed detection period, thereby minimizing the speed variations.

In the embodiment shown in FIG. 10, a tension sensor 31 is interposed between guides 3a and 3b. The signal detected by the tension sensor 31 is input to a tension converter 32 which converts it into a tension signal in accordance with the characteristic of the tension sensor. The tension signal is input to a comparator 30, where it is compared with a target tape tension value TTREF. The comparator 30 thus outputs a tension error signal.

The tension error signal is amplified by a tension control compensator 33 and input to an adder 16.

The adder 16 adds the tension error signal together with the output of a back torque calculator 15 to the output of a supply reel inertia compensator 23S, and the resulting sum is input to a supply reel motor driving circuit 8S.

A current IS is supplied to a supply reel motor 7S from a supply reel motor driving circuit 8S, so that the supply reel motor 7S is rotated, thereby reeling out the tape 1.

According to this embodiment, the tension is detected by a tension sensor, and is compared with a target tape tension value. The resulting error signal is used to control the torque of the supply reel 7S. Regardless of whether the apparatus is in steady or transient state, therefore, or even when an error occurs in the tape radius or the reel inertia, the tape tension can always be controlled to a predetermined target value.

Since certain changes may be made in the above apparatus and system without departing from the scope of the invention herein involved, it is intended that all matter contained in the above description or shown in the accompanying drawings shall be interpreted as illustrative and not in a limiting sense.

We claim:

1. A capstanless tape driving method for maintaining tape tension and tape speed at respective target values by controlling two reel motors for driving a supply reel and a take-up reel, respectively according to the tape speed, said method comprising the steps of:

estimating a load torque imposed on said take-up reel motor from a current in said take-up reel motor and a rotational speed of said take-up reel; and adjusting a current value supplied to said take-up reel motor based on the estimated load torque.

2. A capstanless tape driving method for maintaining tape tension and tape speed at respective target values by controlling two reel motors for driving a supply reel and a take-up reel, respectively, according to the tape speed, said method comprising the steps of:

estimating a load torque imposed on said take-up reel motor from a current in said take-up reel motor and a rotational speed of said take-up reel; and adjusting a current value supplied to said take-up reel motor based on the estimated load torque;

wherein said step of estimating a load torque includes a substep of determining a load torque Y1 from the equation $$Y1 = \omega T \cdot g \cdot JT - (IT \cdot KT + g \cdot JT \cdot \omega T) \cdot g/(s+g)$$

wherein $\omega T$ is a rotational angular velocity of the take-up reel, IT is a current for driving a take-up reel motor, g is a cut-off frequency of a low-pass filter, JT is a moment of inertia of the take-up reel, KT is a torque constant of the take-up motor, and "s" is a Laplace operation.

3. An information recording and reproduction apparatus driven by said capstanless tape driving method according to claim 2.

4. A capstanless tape driving method for maintaining a tape tension and a tape speed at respective target values by controlling two reel motors for driving a supply reel and a take-up reel, respectively, in accordance with the tape speed, said method comprising the steps of:

detecting a period of the tape speed; and adjusting a gain of a speed control system for controlling a rotational speed of the take-up reel based on a predetermined relation between a tape speed detection period and the gain of the speed control system.

5. A capstanless tape driving method according to claim 4, wherein said step of detecting a period of tape speed includes a substep of detecting a period of the tape speed from the rotational period of said take-up reel.

6. An information recording and reproduction apparatus driven by said capstanless tape driving method according to claim 5.

7. An information recording and reproduction apparatus driven by said capstanless tape driving method according to claim 4.

8. A capstanless tape driving method for maintaining a tape tension and a tape speed at respective target values by controlling two reel motors for driving a supply reel and a take-up reel, respectively, in accordance with a tape speed, said method comprising the steps of:

estimating a load torque imposed on said take-up reel motor from a current in the take-up reel motor and a rotational speed of said take-up reel;

adjusting a current value supplied to said take-up reel motor based on said estimated load torque;

receiving a signal generated in correspondence with a tape feed rate;

comparing said the received signal with a reference signal; and controlling a torque of the take-up reel motor such that said tape feed rate assumes a predetermined value based on the comparison result.

9. An information recording and reproduction apparatus driven by said capstanless tape driving method according to claim 8.

10. A capstanless tape driving method for maintaining a tape tension and a tape speed at respective target values by controlling two reel motors for driving a supply reel and a take-up reel, respectively, in accordance with a tape speed, said method comprising the steps of:

estimating a load torque imposed on said take-up reel motor from a current in the take-up reel motor and a rotational speed of said take-up reel;

adjusting a current value supplied to said take-up reel motor based on said estimated load torque;

receiving a signal generated in correspondence with a tape feed rate;

comparing said the received signal with a reference signal;

controlling a torque of the take-up reel motor such that said tape feed rate assumes a predetermined value based on the comparison result;

detecting a period of the tape speed; and adjusting a gain of a speed control system for controlling the rotational speed of the take-up reel based on a predetermined relation between a tape speed detection period and a gain of the speed control system.

11. A capstanless tape driving method according to claim 10, wherein said step of detecting the tape speed period includes a substep of detecting said tape speed period from a rotation period of said take-up reel.

12. An information recording and reproduction apparatus driven by said capstanless tape driving method according to claim 11.

13. An information recording and reproduction apparatus driven by said capstanless tape driving method according to claim 10.

14. An information recording and reproduction apparatus driven by a capstanless tape driving method for maintaining tape tension and tape speed at respective target values by controlling two reel motors for driving a supply reel and a take-up reel, respectively according to the tape speed, said method comprising the steps of:

estimating a load torque imposed on said take-up reel motor from a current in said take-up reel motor and a rotational speed of said take-up reel; and adjusting a current value supplied to said take-up reel motor based on the estimated load torque.

15. A capstanless tape driving method for maintaining tape tension and tape speed at respective target values by controlling two reel motors for driving a supply reel and a take-up reel, respectively, in accordance with the tape speed, said method comprising the steps of:

generating a reference signal having a frequency proportional to the target value of the tape speed;

detecting a signal having a frequency proportional to a tape feed rate;

detecting a phase difference between said reference signal and said signal having said frequency proportional to said tape feed rate; and controlling a torque of said reel motor for driving a take-up reel based on the detected phase difference.

16. An information recording and reproduction apparatus driven by said capstanless tape driving method according to claim 15.

* * * * *